(No Model.)
W. D. HOUSE.
FLOUR SIFTER.
No. 542,476. Patented July 9, 1895.
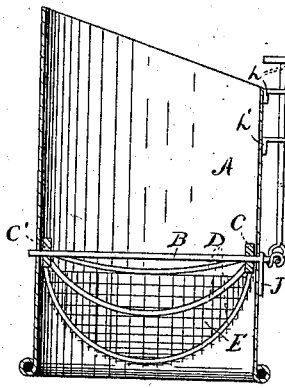
Fig I.
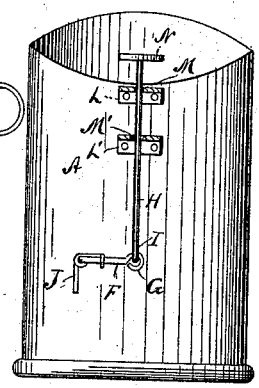
Fig II.
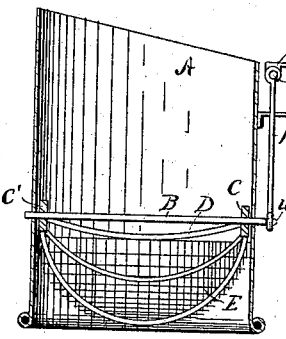
Fig V.
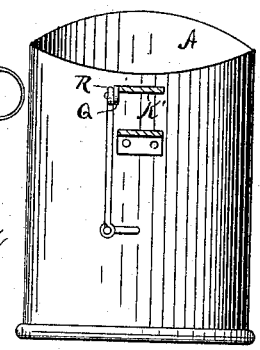
Fig VI.
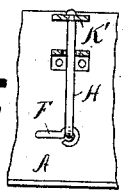
Fig VII.
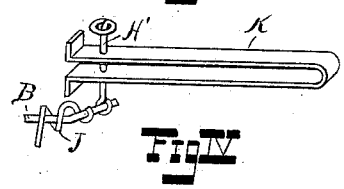
Fig IV.
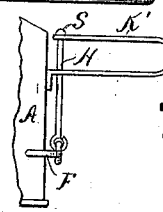
Fig VIII.
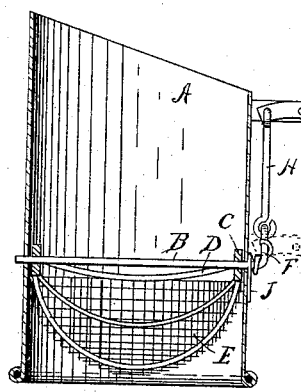
Fig IX.
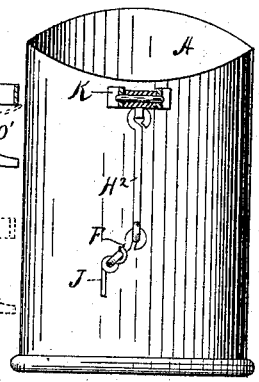
Fig X.
Witnesses
Inventor
Warren D. House

UNITED STATES PATENT OFFICE.

WARREN D. HOUSE, OF KANSAS CITY, MISSOURI.

FLOUR-SIFTER.

SPECIFICATION forming part of Letters Patent No. 542,476, dated July 9, 1895.

Application filed June 14, 1892. Serial No. 436,743. (No model.)

*To all whom it may concern:*

Be it known that I, WARREN D. HOUSE, a citizen of the United States, residing at Kansas City, in the county of Jackson and State of Missouri, have invented certain new and useful Improvements in Flour-Sifters, of which the following is a specification, reference being had therein to the accompanying drawings.

My invention relates to improvements in flour-sifters.

The object of my invention is to provide a sifter that may be operated with the use of but one hand.

My invention is adapted particularly to the class of sifters wherein revoluble beaters or wires having a reciprocating motion are made to pass through the flour in close proximity to or against a wire screen through which the flour passes during the sifting operation.

In the accompanying drawings, illustrative of my invention, Figure I represents a side elevation with the body of the sifter in section. Fig. II represents a rear elevation with the handle in section. Fig. III represents a modification of the return-spring. Fig. IV represents a modified form of presser-rod. Fig. V represents a side view of a form wherein the return-spring is incorporated with the handle of the sifter. Fig. VI represents a rear elevation of the form shown in Fig. IV with the handle in section. Fig. VII represents a modified form in rear elevation with the handle in section. Fig. VIII represents a side view of the style shown in Fig. VII. Fig. IX represents a side elevation of another form of my invention, and Fig. X represents in rear elevation the form shown in Fig. IX.

Similar letters of reference indicate similar parts.

Referring to the drawings, A indicates the body of the sifter, consisting of a tubular shell open at both ends and provided with a semispherical shaped sieve E, having the concave side up and secured in any suitable manner to the inner periphery of the body of the sifter.

The body A of the sifter is provided with openings in the sides oppositely located at a suitable distance above the sieve E. The beater-shaft B is mounted in the said openings, and has one end F bent nearly at right angles outside the sifter-body, the extremity of the said end of the beater-shaft being formed into a loop G, that is loosely connected with a loop I, formed at the lower end of a vertical rod H, the upper end of which is provided with a button N.

The handle K of the sifter is preferably a U-shaped strap placed horizontally one leg over the other and having the ends of the legs bent at right angles into the projections L L', respectively, and which are secured by soldering or other suitable manner to the upper end of the rear side of the body. The handle is preferably secured to the center of the body— that is, at its shortest side, the beater-shaft emerging from the body of the sifter to the right or left of the vertical rod H. Openings M M' are respectively provided in the legs of the handle, through which the rod H passes, the rod being guided by the upper opening and the lower opening being sufficiently large to permit of the side movement of the rod when the rod is operated up and down. A coil-spring J is mounted preferably on the portion of the beater-shaft just outside of the body. One end of the spring is secured by solder or otherwise to the body of the sifter or to any other immovable portion, while the other end of the coil-spring is secured to or bent around the bent end of the beater-shaft.

A flat spring O, (shown in dotted lines on the upper leg of the handle in Fig. I) may be used in place of the spring J, or a coil-spring P, (shown in Fig. III,) may be placed on the upper part of the rod H, above and bearing upon the top part of the handle, as illustrated in Fig. III.

In Fig. IV I have shown the vertical push-wire H' formed at its top so as to give a good bearing surface for the thumb.

C C' indicate circular metallic disks secured one at each end of the beater-shaft, respectively, inside the body A.

The beater-wires D D D are bent to conform to the shape of the sieve E, and are secured at the ends to the disks C C', respectively. They are arranged at equal distances apart, so as to cover, say, one-half the circumference of a circle, and so as to pass against or in close proximity to the sleeve E.

In Figs. V, VI, VII, and VIII, H' indicates a U-shaped handle having the lower end only secured to the body of the sifter A, and having the upper leg connected to the vertical rod H by a projection T, which is secured to a projection Q, depending from the inner end of the handle at its side, pivoted within a loop R in the upper end of the rod H. The lower end of the vertical rod H is loop-shaped and has a pivoted connection with the bent end of the beater-shaft B, at F.

In Figs. VII and VIII, I have shown the rod H passing through an opening in the lower end of the handle K' and secured firmly by soldering or riveting to the upper leg of the handle. When the upper leg of the handle is depressed the tension in the handle causes it to draw up the rod H when the pressure is removed, thus imparting a reciprocating movement to the beater-shaft.

In Figs. IX and X, I have shown a modification of my invention. In this form a pivoted lever V is mounted preferably upon a pin W, which is secured at each end to a leg of the U-shaped handle K", which has its legs placed side by side instead of in the manner already described in the other forms of my invention. H" indicates a wire rod having a loop in its lower end which is connected to the bent portion F of the beater-shaft. The other end of the rod is connected to the inner end of the lever V. A coil-spring J similar to the one shown in Fig. I is connected to the beater-shaft.

In Fig. IX, I have shown in dotted lines a flat spring O' that is secured to the lever V at a point back of its pivotal point and which has a bearing against the handle K" in such a manner as to keep the lever V depressed at the rear.

I have shown in dotted lines a means of omitting the connecting-rod H" in Fig. IX. The handle K" is placed lower upon the body in a position that the lever V may press directly upon the bent portion of the beater-shaft, the other parts being substantially the same as already described.

In operating the style shown in Figs. IX and X, the lever is raised at the rear. This depresses the beater-shaft and causes a partial revolution of the beater-shaft. As soon as the pressure is removed the spring J causes, by its tension upon the beater-shaft, a return of the beater-arms to the original position.

In the styles shown in Figs. I, II, III, and IV the thumb, in depressing the vertical rod H H', causes the same action to take place as heretofore described.

In the forms shown in Figs. V, VI, VII, and VIII the hand, in depressing the upper part of the handle K', causes the rod to which it is secured to press against the bent arm of the beater-shaft and thus cause a partial revolution of the beaters. The spring in the handle of itself compels the return motion of the beaters.

The reciprocating motion given the beaters in my invention is much superior as a sifting-medium to the ordinary rotation of the beaters in one direction, as it prevents the scattering of the flour and also allows the beaters to be moved at a greater distance away from the sieve, thus making the operation easy and reducing the wear in the working-parts. With the use of a sifter made in accordance with the principles of my invention, one hand is free to be used for another purpose, such as stirring with a spoon. It also permits the use of one hand for mixing, while at the same time using the sifter.

Having thus described my invention, what I claim, and desire to secure by Letters Patent of the United States, is—

1. In a sifter of the kind described, the combination with the beater shaft having an end bent, a coil spring having one end connected to the beater shaft, and the other end connected to the body of the sifter, and mechanism connected to the handle of the sifter and to the bent arm of the beater shaft, whereby the hand holding the handle may operate the shaft against the pressure of the spring, substantially as described.

2. In a sifter of the kind described the combination with a movable arm connected to or in close proximity to the sifter handle, of a bent beater shaft connected to the said movable arm and a spring tension between the said parts adapted to resist the pressure of the hand when said pressure is applied to the movable arm.

3. The combination with the beater shaft, B, of the bent arm F, rod H, and spring J as specified.

4. The combination with the bent shaft, B, the handle K and connecting arm H, the beater shaft being provided with a spring connection with the body of the sifter, as specified.

5. In a sifter, the combination with a beater having a cranked shaft, of an operating rod connected to the crank, and a handle of resilient material, connected at one end to the body of the sifter and at its other end to the operating rod; substantially as described.

6. In a sifter, the combination with a beater having a cranked shaft, of a pivoted lever connected at one end to the crank, and a spring for normally holding the other end of the lever depressed; substantially as described.

7. In a sifter, the combination with a beater having a cranked shaft, of a pivoted lever connected to the crank, a handle within which the lever is pivoted, and a spring for normally holding the free end of the lever depressed; substantially as described.

8. In a sifter, the combination with a beater having a cranked shaft, of an operating rod journaled to the crank, a pivoted lever connected to the operating rod, a handle within which the lever is pivoted, and a spring for holding the free end of the lever depressed; substantially as described.

9. In a sifter, the combination with a beater having a cranked shaft, of an operating rod journaled to the crank, a pivoted lever connected to the operating rod, a handle within which the lever is pivoted, and a torsion spring connected at one end to the body of the sifter and at the other end to the crank for holding the free end of the lever depressed; substantially as described.

10. In a sifter, the combination with a beater having a cranked shaft, of an operating rod having at its lower end an eye through which the crank passes freely, and having at its upper end a thumb-presser top or cap, a handle in proximity to the operating rod, said handle having guides through which the rod passes, and a spring acting in opposition to the rod, substantially as described.

In testimony whereof I affix my signature in presence of two witnesses.

WARREN D. HOUSE.

Witnesses:
 FRANK C. WARD,
 J. F. GILMORE.